US008265096B2

(12) United States Patent
Zheng et al.

(10) Patent No.: US 8,265,096 B2
(45) Date of Patent: Sep. 11, 2012

(54) METHOD FOR CONSTRUCTING FRAME STRUCTURES

(75) Inventors: Yan-Xiu Zheng, Shulin (TW); Ren-Jr Chen, Hsinchu (TW); Chang-Lung Hsiao, Hsinchu (TW); Pang-An Ting, Fongyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 385 days.

(21) Appl. No.: 12/168,855

(22) Filed: Jul. 7, 2008

(65) Prior Publication Data

US 2009/0016371 A1 Jan. 15, 2009

Related U.S. Application Data

(60) Provisional application No. 60/929,798, filed on Jul. 12, 2007, provisional application No. 60/973,157, filed on Sep. 17, 2007.

(51) Int. Cl.
*H04J 3/24* (2006.01)

(52) U.S. Cl. ......... 370/473; 370/474; 370/476; 455/448

(58) Field of Classification Search ............. 370/329, 370/478, 491, 349, 469, 473, 474, 476, 338; 375/148, 354

See application file for complete search history.

(56) References Cited

U.S. PATENT DOCUMENTS

| | | | |
|---|---|---|---|
| 5,491,531 A * | 2/1996 | Adams et al. ............... | 375/354 |
| 6,904,550 B2 | 6/2005 | Sibecas et al. | |
| 7,110,350 B2 | 9/2006 | Li et al. | |
| 7,586,887 B2 * | 9/2009 | Trachewsky ................ | 370/338 |
| 7,809,020 B2 * | 10/2010 | Douglas et al. ............. | 370/474 |
| 8,077,592 B2 | 12/2011 | Webster et al. | |
| 2002/0034172 A1 * | 3/2002 | Ho ............................... | 370/338 |
| 2004/0223478 A1 * | 11/2004 | Fischer et al. .............. | 370/338 |
| 2005/0063345 A1 | 3/2005 | Wu et al. | |
| 2005/0111529 A1 * | 5/2005 | Bradley ....................... | 375/148 |
| 2005/0180461 A1 | 8/2005 | Kao et al. | |
| 2006/0018279 A1 | 1/2006 | Agrawal et al. | |
| 2006/0227778 A1 | 10/2006 | Jin et al. | |
| 2007/0097946 A1 * | 5/2007 | Mujtaba ...................... | 370/349 |
| 2007/0155315 A1 | 7/2007 | Lee et al. | |
| 2007/0189149 A1 * | 8/2007 | Terabe ......................... | 370/491 |
| 2008/0095195 A1 * | 4/2008 | Ahmadi et al. ............. | 370/478 |
| 2008/0285513 A1 * | 11/2008 | Jung et al. ................... | 370/329 |
| 2009/0016371 A1 | 1/2009 | Zheng et al. | |
| 2009/0116435 A1 * | 5/2009 | Koorapaty et al. .......... | 370/329 |
| 2011/0222504 A1 | 9/2011 | Ma et al. | |
| 2012/0140730 A1 * | 6/2012 | Marks et al. ................ | 370/330 |

FOREIGN PATENT DOCUMENTS

WO    WO 2006/092852    *    8/2006

* cited by examiner

*Primary Examiner* — Jeffrey M Rutkowski
(74) *Attorney, Agent, or Firm* — Alston & Bird LLP (57) ABSTRACT

A method of constructing a frame structure for data transmission, the method comprising generating a first section comprising data configured in a first format compatible with a first communication system, generating a second section following the first section, the second section comprising data configured in a second format compatible with a second communication system, wherein the second format is different from the first format, generating at least one non-data section containing information describing an aspect of data in at least one of the first section and the second section, and combining the first section, the second section and the at least one non-data section to form the frame structure.

43 Claims, 6 Drawing Sheets

METHOD FOR CONSTRUCTING FRAME STRUCTURES

CROSS-REFERENCE TO RELATED APPLICATION

This application claims the benefit of U.S. Provisional Application No. 60/929,798, entitled "Frame Structure in Wireless Communication Systems," filed Jul. 12, 2007, and 60/973,157, entitled "Bandwidth Scalable OFDMA Frame Structure," filed Sep. 17, 2007. These applications are hereby incorporated by reference in their entirety.

BACKGROUND

The present invention generally relates to orthogonal frequency-division multiple access (OFDMA) systems, and more particularly, the present invention relates to methods for constructing frame structures in OFDMA systems.

Orthogonal Frequency Division Multiple Access (OFDMA) is a multiple access scheme for transmitting data in different subcarriers in a channel, wherein the data may come from different users and may be transmitted in disjoint subsets of sub-channels in a transmission bandwidth. The orthogonality property among the subcarriers may allow simultaneous transmission of data from different users without interference from one other. The multiple access scheme of the OFDMA may generally be applied in various communication systems, such as those defined in IEEE standard 802.16e ("legacy system" hereafter) and IEEE standard 802.16m ("new system" hereafter). The new system defined in the IEEE standard 802.16m may be required to provide enhanced spectrum efficiency, higher speed tolerance and full backward compatibility with the legacy system defined in the IEEE standard 802.16e.

Figure 1:
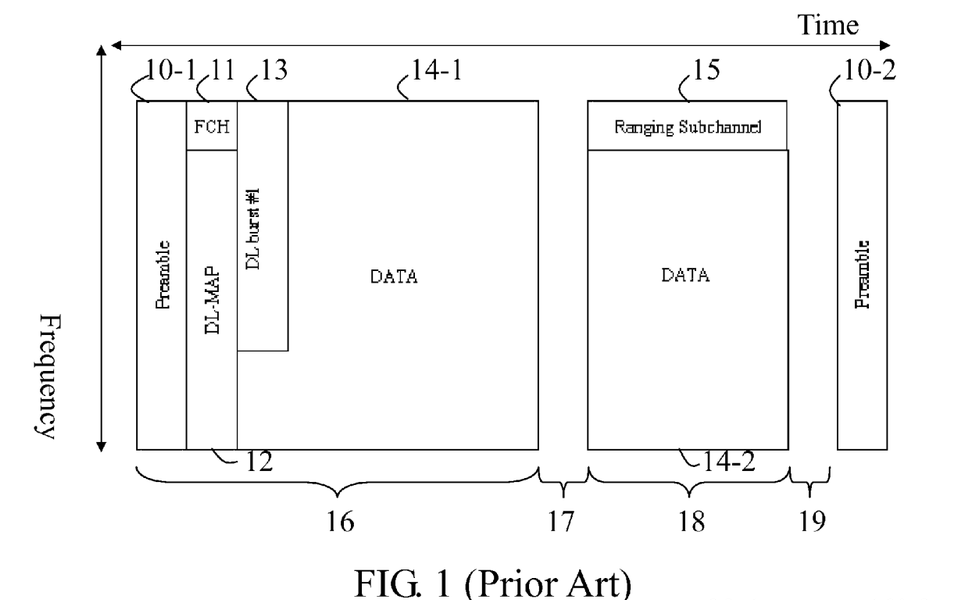
FIG. 1 is a diagram illustrating an orthogonal frequency-division multiple access (OFDMA) frame structure under the IEEE 802.16 standard.

FIG. 1 is a diagram illustrating an OFDMA frame structure under the IEEE 802.16 standard. Referring to FIG. 1, the frame structure may include a downlink sub-frame (DL sub-frame) 16 and an uplink sub-frame (UL sub-frame) 18. The UL sub-frame 18 may follow the DL sub-frame 16 in time domain with a transmit/receive transmission gap (TTG) 17 from the DL sub-frame 16. Moreover, the frame structure may be separated from the next frame structure, led by a preamble 10-2, by a receive/transmit transmission gap (RTG) 19.

The DL sub-frame 16 may include a preamble 10-1, a frame control header (FCH) 11, a downlink map (DL-MAP) 12, a downlink burst (DL burst#1) 13 and a data region (DATA) 14-1. The UL sub-frame 18 may include a ranging sub-channel 15 and a data region (DATA) 14-2. Since the DL-MAP 12 may be used to identify the division or structure of the DATA 14-1 in the DL sub-frame 16, it may be desirable to integrate the OFDMA frame structure of an old OFDMA system with that of a new OFDMA system by using the DL-MAP 12 to define different zones in the DATA 14-1 and DATA 14-2 of the frame structure for data of the old OFDMA system and data of the new OFDMA system.

Figure 2:
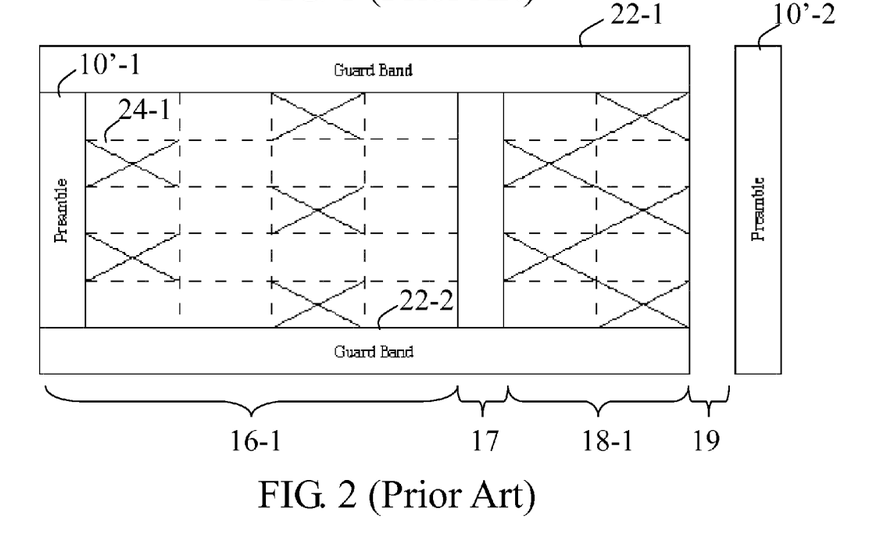
FIG. 2 is a diagram illustrating a placement of guiding signals for OFDMA signals under the IEEE 802.16 standard.

FIG. 2 is a diagram illustrating a placement of guiding signals (or pilot symbols) 24-1 for time-domain and frequency-domain OFDMA signals under the IEEE 802.16 standard. Referring to FIG. 2, upper and lower frequency bands may serve as guard bands 22-1 and 22-2, respectively, which may not be used to carry information. The placement of information may include a first part and a second part. For example, the first part of the placement includes a preamble 10'-1 having a fixed length, and the second part of the placement includes data and guard intervals between an upper row and a lower row of the data interlaced with the pilot symbols 24-1, represented by blocks marked with "X". In some applications such placement of information may be inflexible to bandwidth scaling due to the fixed-length preambles 10'-1 and/or 10'-2 and the often unusable guard bands 22-1 and 22-2. Moreover, the placement may be susceptible to a Doppler effect in a high mobility scenario because the placement may be usually designed with a relatively large symbol period, which in turn may induce relatively short carrier spacing and less dense pilot symbol placement. Moreover, the limitation on pilot symbol placement may cause channel estimation error at a receiving end because of insufficient information provided for channel estimation.

SUMMARY

Examples of the present invention may provide a method for constructing a frame structure for data transmission, the method comprising generating a first section comprising data configured in a first format compatible with a first communication system, generating a second section following the first section comprising data configured in a second format compatible with a second communication system, wherein the second format is different from the first format, generating at least one non-data section containing information describing an aspect of data in at least one of the first section and the second section, and combining the first section, the second section and the at least one non-data section to form the frame structure.

Examples of the present invention may provide a method of generating a frame for transferring data in a communication system. The communication system may include a first system and a second system. The method may include generating a first sub-frame for downlink transmission, wherein the first sub-frame comprises a first region comprising first mapping information, a second region comprising second mapping information, and a third region carrying data to be transferred in the downlink transmission, the third region comprising a first sub-region and a second sub-region, wherein the first sub-region and second sub-region are defined by the first mapping information, the first sub-region being capable of carrying first data of the first system and the second sub-region being capable of carrying second data of the second system in the downlink transmission, and generating a second sub-frame for uplink transmission, wherein the second sub-frame comprises a fourth region carrying data to be transferred in the uplink transmission, the fourth region comprising a third sub-region and a fourth sub-region, wherein the third sub-region and the fourth sub-region are defined by the second mapping information, the third sub-region being capable of carrying third data of the first system and the fourth sub-region being capable of carrying fourth data of the second system in the uplink transmission.

Examples of the present invention may also provide a method of generating a frame for transferring data in a communication system. The communication system may include a first system and a second system. The method may include generating a first frame comprising a first sub-frame for downlink transmission and a second sub-frame for uplink transmission in a first band, generating a second frame comprising a third sub-frame for downlink transmission and a fourth sub-frame for uplink transmission in a second band, identifying a guard band between the first band and the second band, and generating a third frame comprising a fifth sub-frame for downlink transmission and a sixth sub-frame for uplink transmission in the guard band.

Examples of the present invention may provide a method for allocating information in a frame of a communication system. The communication system may include a first system and a second system. The frame may be used for first data transmission of the first system and second data transmission of the second system. The method may include allocating data of the first system and the second system in first mapping information, dividing a data region of the frame to form a first sub-region and a second sub-region according to the first mapping information, performing the first data transmission of the first system by using the first sub-region and performing the second data transmission of the second system by using the second sub-region.

Examples of the present invention may provide another method for allocating information in a frame of a communication system. The frame may include a first frame, a second frame and a band between the first frame and the second frame. The communication system may include a first system and a second system. The frame may be used for first data transmission of the first system and second data transmission of the second system. The method may include allocating data of the first system and the second system in first mapping information or second mapping information, dividing a data region of the first frame or the second frame to form a first sub-region, a second sub-region, a third sub-region or a second sub-region in the data region of the first frame or the second frame according to the first mapping information or the second mapping information, performing the first data transmission of the first system by using the first sub-region or the third sub-region and performing the second data transmission of the second system by using the second sub-region or the fourth sub-region.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION

Reference will now be made in detail to various embodiments of the invention, examples of which are illustrated in the accompanying drawings. Wherever possible, the same reference numbers will be used throughout the drawings to refer to the same or like parts.

Examples of the present invention may allow data of an old orthogonal frequency-division multiple access (OFDMA) system (hereinafter a legacy system) and data of a new OFDMA system to co-exist in an OFDMA frame by changing a frame structure of the OFDMA frame. The new OFDMA system may have a larger bandwidth and support higher mobility, and may use an updated transmission technology. In order to be backward compatible with the old OFDMA system, the new OFDMA system may be developed based on the old OFDMA system. Throughout the specification, a "new" or "extended" system or standard may refer to an "updated," "evolved" or "next-generation" system or standard, while a "legacy" system or standard may refer to an "old" or "current" system or standard. For example, a "new" standard may be a standard that is in use as of the date of the filing of this application, and a "legacy" standard may be a standard that is in use prior to the date of the filing of this application and may be still in use for some time after the filing of this application.

Figure 3:
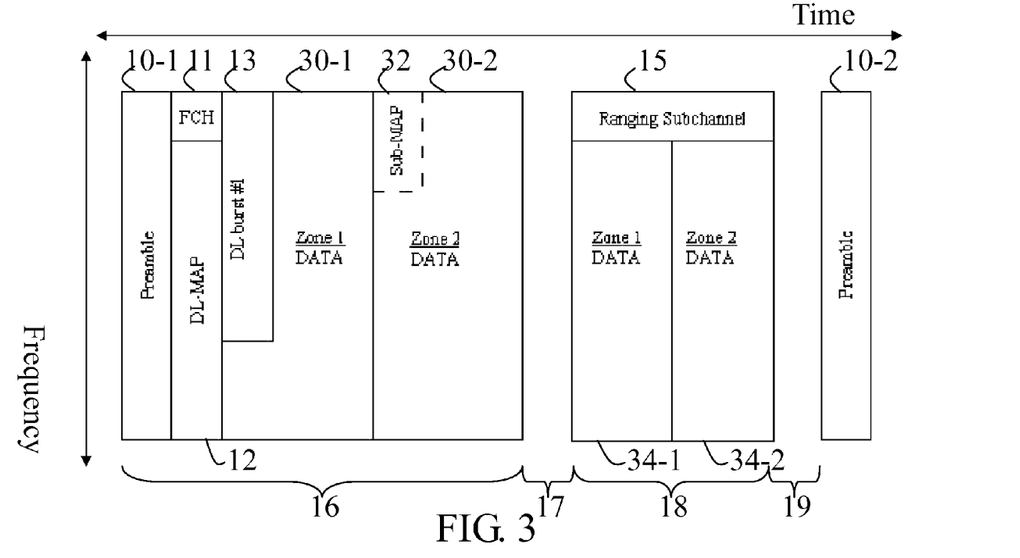
FIG. 3 is a diagram illustrating an OFDMA frame structure according to an example of the present invention.

FIG. 3 is a diagram illustrating an OFDMA frame structure according to an example of the present invention. Referring to FIG. 3, the OFDMA frame structure may include a downlink sub-frame (DL sub-frame) 16 and an uplink sub-frame (UL sub-frame) 18. The DL sub-frame 16 may include a preamble 10-1, an FCH 11, a DL-MAP 12, a DL burst #1 13 with an UP-MAP (not shown), and a data region including DATA 30-1 (zone 1) and DATA 30-2 (zone 2). The UL sub-frame 18 may include a ranging sub-channel 15 and a data region including DATA 34-1 (zone 1) and DATA 34-2 (zone 2).

Data of the new OFDMA system (the extended system) may be carried in extended zones, that is, the DATA 30-2 and/or the DATA 34-2, allocated to the DL sub-frame 16 and/or the UL sub-frame 18, respectively. Furthermore, the extended system in the data region DATA 30-2 and/or the DATA 34-2 may have the same symbol period or the same placement of pilot symbols as the old system (the legacy system) in the data region DATA 30-1 and the DATA 34-1, respectively, in the OFDMA frame structure. In one example, the data region including the two zones DATA 30-1 (zone 1) and DATA 30-2 (zone 2), for the old system and the new system, respectively, may be placed according to the mapping information of the two zones defined in the DL-MAP 11. Similarly, the data region of the UL sub-frame 18 including the two zones DATA 34-1 (zone 1) and DATA 34-2 (zone 2), for the old OFDMA system and the new OFDMA system, respectively, may be placed according to the mapping information of the two zones defined in the UL-MAP in the DL burst #1 13.

Figure 4:
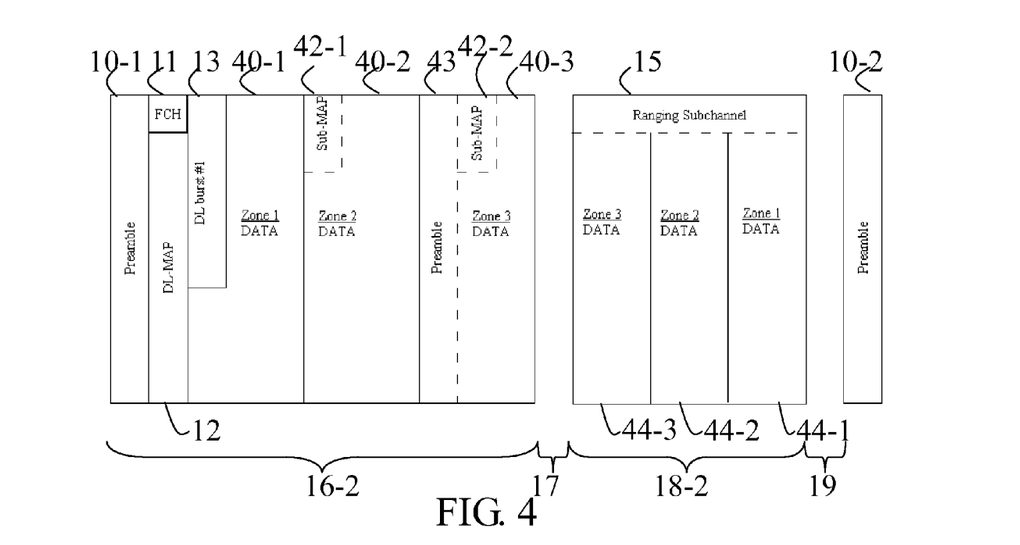
FIG. 4 is a diagram illustrating an OFDMA frame structure supporting high mobility according to an example of the present invention.

FIG. 4 is a diagram illustrating an OFDMA frame structure supporting high mobility according to an example of the present invention. Referring to FIG. 4, the OFDMA frame structure may be similar to that described and illustrated with reference to FIG. 3 except that, for example, a DL sub-frame 16-2 may further include a preamble 43, a sub-MAP 42-2 and a data region DATA 40-3 (zone 3), and a UL sub-frame 18-2 may further include a data region DATA 44-3 (zone 3). To support communication in a high-mobility environment, the zones 3 for the new system (the extended system) under high mobility may be allocated to the data region of both the DL sub-frame 16-2 and the UL sub-frame 18-2. The DATA 40-3 and/or 44-3 (zones 3) may have a shorter symbol period or more pilot symbols placed therein than the DATA 40-1, 40-2, 44-1 and 44-2 in order to enhance the performance of channel estimation. Generally, a shorter symbol period may be more robust to inter-symbol interference, while denser pilot symbols may achieve better channel estimation accuracy. Moreover, the DATA 40-3 of the DL sub-frame 16-2 for the new system (extended system) under high mobility may be divided based on the mapping information defined in at least one of the DL-MAP 11 and the sub-MAP 42-2 of DATA 40-3, and the DATA 44-3 of the UL sub-frame 18-2 for the new system (extended system) under high mobility may be divided based on the mapping information defined in the UL-MAP (not shown) in the DL burst#1 13. Placements of pilot symbols, symbol periods of OFDM symbols and FFT sizes in the zones 1 for the old (legacy) system and the zones 2 for the new (extended) system may be the same in the DL sub-frame 16-2 and the UL sub-frame 18-2. The preamble 43 placed in front of the zone 3 of the DL sub-frame 16-2 for the new system (extended system) may be used to support high mobility. As compared to the zones in the data region of the UL sub-frame 18-2 or the DL sub-frame 16-2 of the old/legacy system or the new/extended system, the placements of the pilot symbols may be denser, the symbol periods of OFDM symbols may be shorter and the FFT sizes may be smaller in the DATA 40-3 and/or DATA 44-3 of the DL sub-frame 16-2 or the UL sub-frame 18-2, respectively, for the extended system under high mobility.

Figure 5:
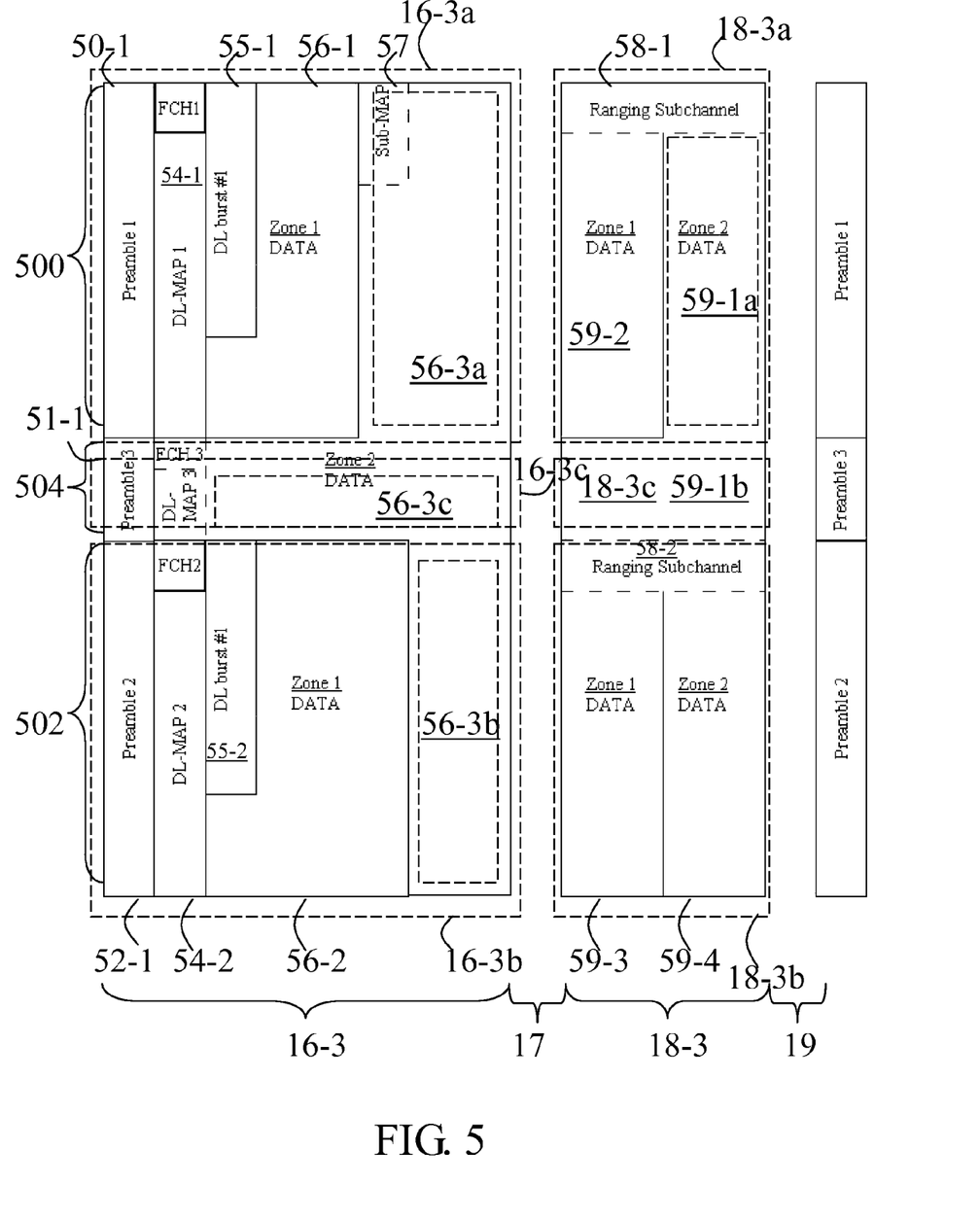
FIG. 5 is a diagram illustrating an OFDMA frame structure with a scalable bandwidth according to an example of the present invention.

FIG. 5 is a diagram illustrating an OFDMA frame structure with a scalable bandwidth according to an example of the present invention. Referring to FIG. 5, the OFDMA frame structure may include a first frame structure 500, a second frame structure 502 and a third frame structure 504. The first frame structure 500 may include a first DL sub-frame 16-3*a* and a first UL sub-frame 18-3*a*, the second frame structure 502 may include a second DL sub-frame 16-3*b* and a second UL sub-frame 18-3*b*, and the third frame structure 504 may include a third DL sub-frame 16-3*c* and a third UL sub-frame 18-3*c*. The first frame structure 500, which may be allocated to a first band, may be similar to the frame structure described and illustrated with reference to FIG. 3. Specifically, the first DL sub-frame 16-3*a* of the first frame structure 500 may include a preamble 50-1, an FCH, a DL-MAP 54-1, a DL burst #1 55-1 with an UL MAP (not shown), DATA 56-1 (zone 1) for the old OFDMA system (legacy system) and DATA 56-3*a* (zone 2) for the new OFDMA system (extended system). The first UL sub-frame 18-3*a* of the first frame structure 500 may include a ranging sub-channel 58-1, DATA 59-2 (zone 1) in the data region for the old OFDMA system (legacy system) and DATA 59-1*a* (zone 2) in the data region for the new OFDMA system (extended system).

The second frame structure 502, which may be allocated to a second band, may be similar to the frame structure described and illustrated with reference to FIG. 3. Similarly, the second DL sub-frame 16-3*b* of the second frame structure 502 may include a preamble 52-1, an FCH, a DL-MAP 54-2, a DL burst #1 55-2 with an UL MAP (not shown), DATA 56-2 (zone 1) in a data region for the old OFDMA system (legacy system) and DATA 56-3*b* (zone 2) in the data region for the new OFDMA system (extended system), and the second UL sub-frame 18-3*b* of the second frame structure 502 may include a ranging sub-channel 58-2, DATA 59-3 (zone 1) in a data region for the old OFDMA system (legacy system) and DATA 59-4 (zone 2) in the data region for the new OFDMA system (extended system).

The third frame structure 504, which may be allocated to a third band, may be arranged between the first frame structure 500 and the second frame structure 502. Specifically, a guard band between the first frame structure 500 and the second frame structure 502 may serve as the third frame structure 504 to facilitate data transmission. Unlike the guard band 22-1 or 22-2 in FIG. 2, data to be transmitted in the new (extended) system or a high-mobility system may be allocated to a guard band between the first frame structure 500 and the second frame structure 502. The third frame structure 504 may include a third DL sub-frame 16-3*c* and a third UL sub-frame 18-3*c*. The DL sub-frame 16-3*c* may include a preamble 51-1, an FCH, a DL-MAP and a data region DATA 56-3*c* (zone 3) for the new (extended) system. Furthermore, the UL sub-frame 18-3*c* may include a data region DATA 59-1*b* for the new (extended) system.

An OFDMA frame structure thus constructed may have a scalable bandwidth. For example, data of the old (legacy) OFDMA system in the zones 1 of the first frame structure 500 and the second frame structure 502 may be transmitted in parallel using the first band and second band, respectively, and data of the new (extended) OFDMA system in the third frame structure 504 and the zones 2 of the first frame structure 500 and the second frame structure 502 may be together transmitted using the first, second and third bands. In one example, the first, second and third bands may be contiguous with one another. Furthermore, upper and a lower guard bands (not shown) may be required to transmit the OFDMA frame structure via the first, second and third bands.

The "zone 1" 56-1 of the first frame structure 500 and the "zone 1" 56-2 of the second frame structure 502 may be divided from the data region in the DL sub-frame 16-3*a* of the first frame structure 500 and the data region in the DL sub-frame 16-3*b* of the second frame structure 502, respectively, according to the mapping information in the DL-MAP 54-1 and the DL-MAP 54-2, respectively. Similarly, the UL sub-frame 18-3*a* of the first frame structure 500 and the UL sub-frame 18-3*b* of the second frame structure 502 may be divided based on the mapping information in the UL-MAP in the DL burst #1 55-1 of the first frame structure 500 and the UL-MAP in the DL burst#1 55-2 of the second frame structure 502, respectively.

The guard band 504, which is in a frequency spectrum not used in the old or legacy system, may be used to transfer data in the present example, and the data region of the guard band may be divided based on the mapping information in at least one of the DL-MAP 54-1 or the DL-MAP 54-2. The preamble part of the extended frame structure described and illustrated with reference to FIG. 5 may include the preamble 50-1 and the preamble 52-1. The preamble 51-1 may carry data, or may carry no information. Moreover, the DL-MAP and the FCH in the guard band 504 may be used to divide the data regions 56-3*c* and 59-1*b*. In one example, a Sub-MAP (not shown) may be placed in the DATA 56-3*c* for further description of the extended system.

Figure 6A:
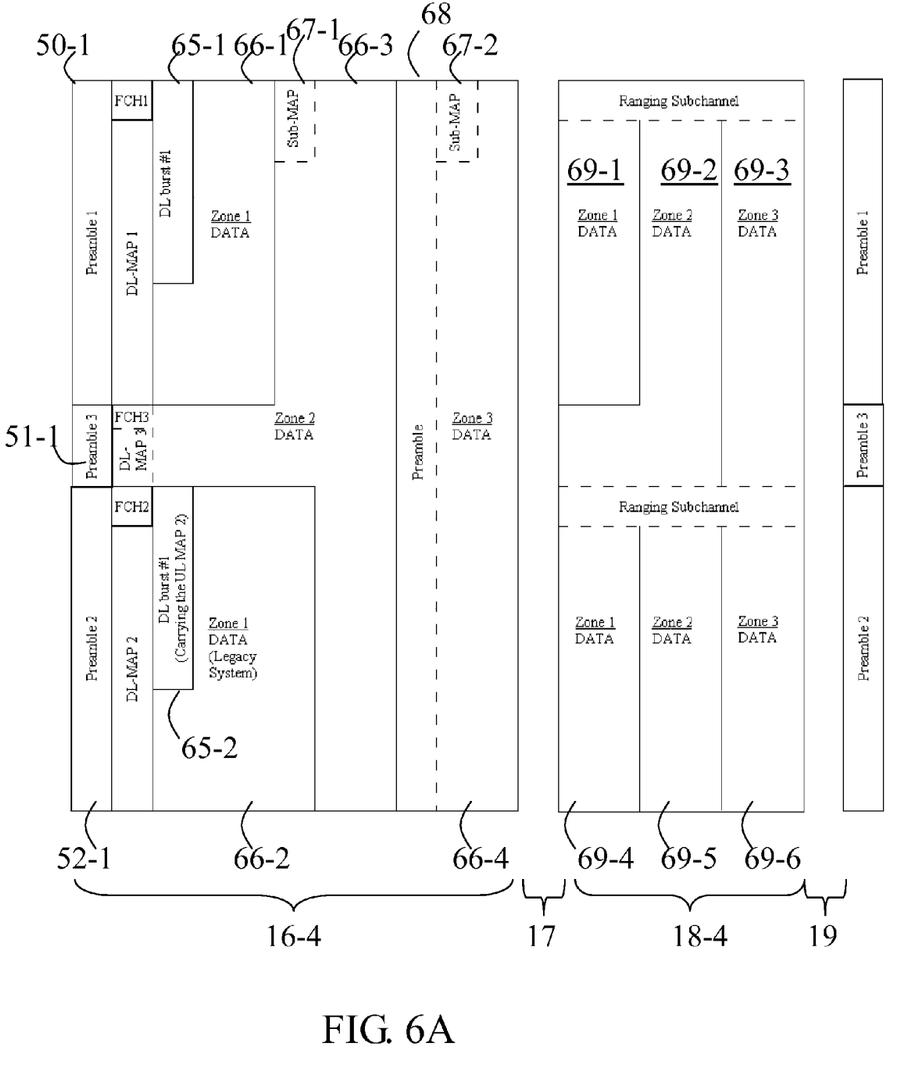
FIG. 6A is a diagram illustrating an OFDMA frame structure supporting high mobility and having a scalable bandwidth according to an example of the present invention.

FIG. 6A is a diagram illustrating an example of an OFDMA frame structure supporting high mobility and having a scalable bandwidth according to an example of the present invention. Referring to FIG. 6A, the frame structure may be similar to the frame structure in FIG. 5 except that, for example, regions related to zones 3 for a high-mobility environment may be added. Specifically, in a DL sub-frame 16-4, a first region may include a preamble 68, a sub-MAP 67-2 and DATA 66-4, and in a UL sub-frame 18-4, a second region may include DATA 69-3 and 69-6 (zones 3). DATA 66-4, 69-3 and 69-6 may be allocated for the new OFDMA system (extended system) under high mobility. The DL sub-frame 16-4 may be divided according to the mapping information in DL-MAP 1, DL-MAP 2 and DL-MAP 3, while the UL sub-frame 18-4 may be divided according to the map information in UL-MAPs in DL burst#1 65-1 and/or 65-2. A portion of the guard band that overlaps data zones 69-1 and 69-2 in the UL sub-frame 18-4 may be used to transmit data in the extended system. In one example, placements of pilot symbols, symbol periods of OFDM symbols and FFT sizes in the zones 1 for the old (legacy) system and the zones 2 for the new (extended) system may be the same in the DL sub-frame 16-4 and the UL sub-frame 18-4. As compared to the zones in the data region of the DL sub-frame 16-4 or the UL sub-frame 18-4 of the old/legacy system or the new/extended system, the placements of the pilot symbols may be denser, the symbol periods of OFDM symbols may be shorter and the FFT sizes may be smaller in the zones 3 of the UL sub-frame 18-4 or the DL sub-frame 16-4 for the extended system under high mobility.

Figure 6B:
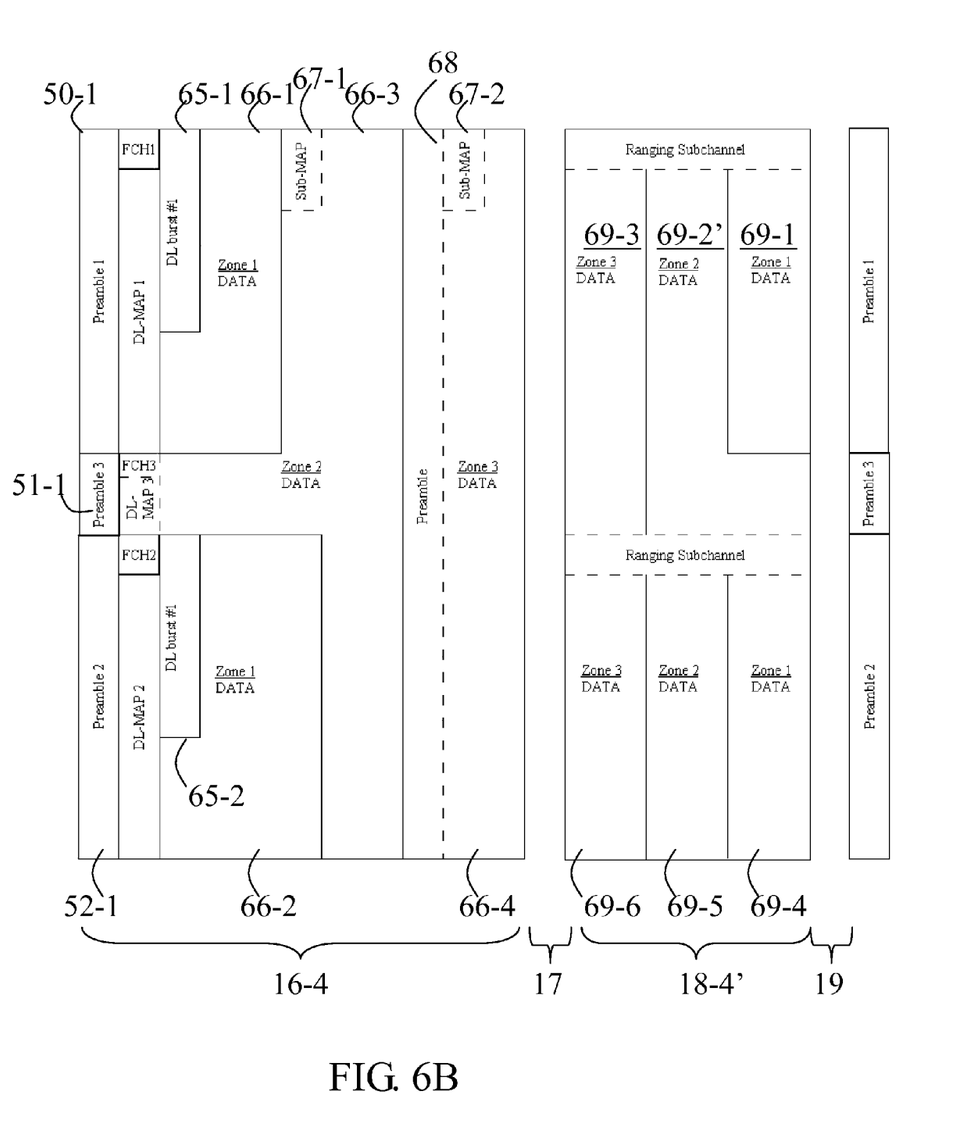
FIG. 6B is a diagram illustrating an OFDMA frame structure supporting high mobility and having a scalable bandwidth according to another example of the present invention.

FIG. 6B is a diagram illustrating an OFDMA frame structure supporting high mobility and having a scalable bandwidth according to another example of the present invention. Referring to FIG. 6B, the OFDMA frame structure may be similar to the OFDMA frame structure described or illustrated with reference to FIG. 6A except that, for example, the zone 2 in a UL sub-frame 18-4' using the guard band may be transmitted after the zone 3 in the UL sub-frame 18-4', and the locations of zones 1 for the legacy system and zones 3 for the new (extended) system for high mobility are swapped.

Figure 7:
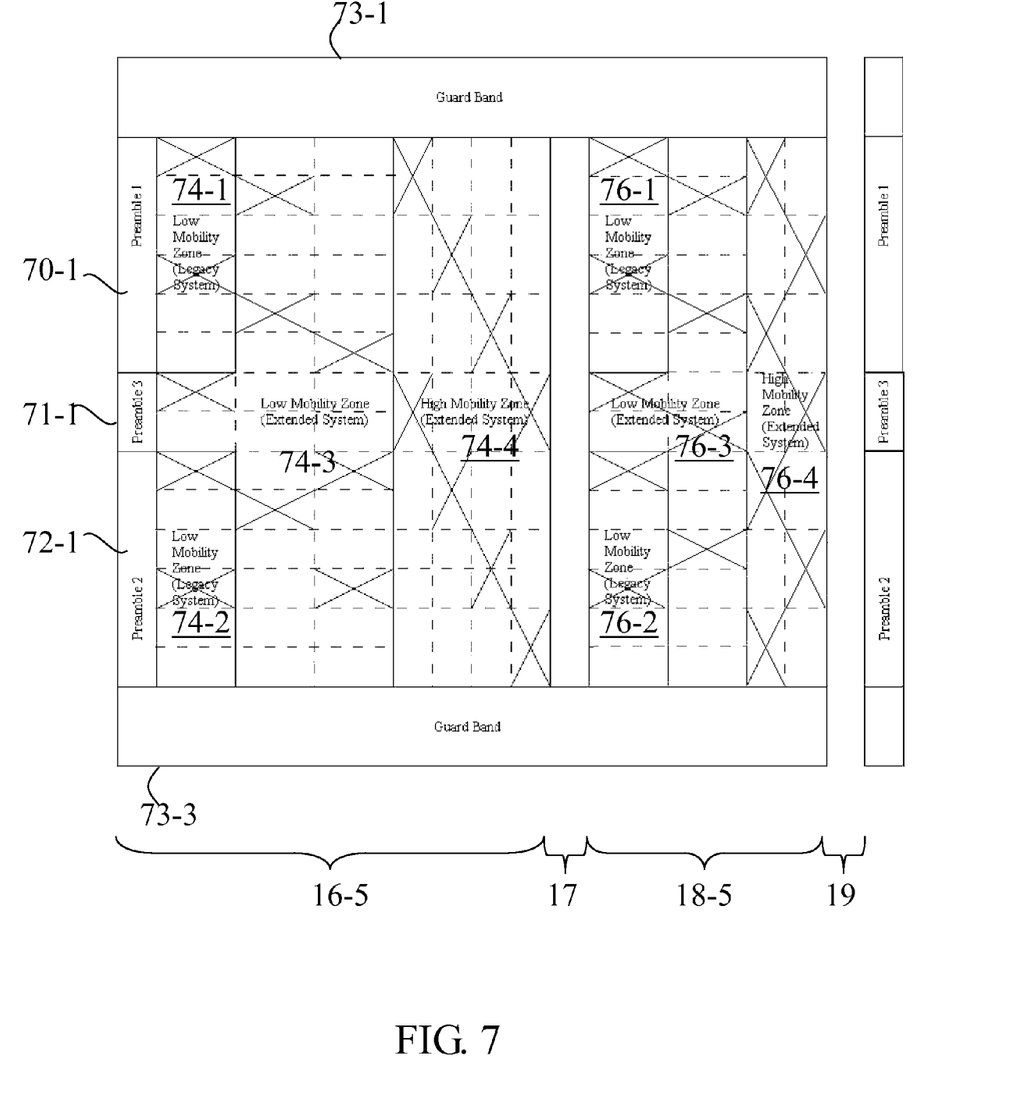
FIG. 7 is a diagram illustrating an exemplary placement of signals and pilots in time-domain and frequency-domain of an OFDMA system supporting high mobility and having a scalable bandwidth.

FIG. 7 is a diagram illustrating an exemplary placement of signals and pilots in time-domain and frequency-domain of an OFDMA system supporting high mobility and having a scalable bandwidth. Referring to FIG. 7, an upper band and a lower band may be guard bands 73-1 and 73-3, respectively. In the prior art, guard bands do not carry any data or signals in a conventional OFDMA system. Consistent with some examples of the present invention, the guard bands 73-1 and 73-3 may be used to carry data or signals. Moreover, to satisfy backward compatibility, preambles 70-1 and 72-1 may be similar to those in the conventional OFDMA system. Similar to those described and illustrated with reference to FIGS. 6A and 6B, signals, pilot symbols, both, or neither may be placed in a preamble 71-1. The placement may define one or more regions, which may include, for example, regions 74-1, 74-2, 76-1 and 76-2 for the old (legacy) OFDMA system, regions 74-3 and 76-3 for the new (extended) OFDMA system supporting lower mobility, and regions 74-4 and 76-4 for the new system supporting high mobility. The old OFDMA system and the new OFDMA system supporting lower mobility may use the same frequency intervals or the placement of pilot symbols. The new OFDMA system supporting high mobility may use larger frequency intervals or shorter OFDM symbol period to avoid frequency jitter. Therefore, the placement of the pilot symbols in a first region such as one of the regions 74-1, 74-2, 76-1 and 76-2 of a frame structure divided for the old OFDMA system may be the same as that in the prior art, the placement of the pilot symbols in a second region such as one of the regions 74-3 and 76-3 of the frame structure divided for the new OFDMA system supporting lower mobility may be the same or denser than the that in the prior art, and the placement of the pilot symbols in a third region such as one of the regions 74-4 and 76-4 of the frame structure divided for the new OFDMA system supporting high mobility may use more denser pilot placement with more pilot symbols for increasing accuracy of the channel estimation.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented a method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A method of constructing a frame structure for data transmission, the method comprising:
   generating a first section comprising data configured in a first format compatible with a first communication system using symbols;
   generating a second section following the first section, the second section comprising data configured in a second format compatible with a second communication system using symbols, wherein the first communication system's symbols and the second communication system's symbols co-exist in one transmission scheme and wherein:
      the second format is compatible with the second communication system configured to support higher mobility than the first communication system, wherein each symbol in the second communication system has a shorter symbol period than that in the first communication system;
   generating at least one non-data section containing information describing an aspect of data in at least one of the first section and the second section; and
   combining the first section, the second section and the at least one non-data section to form the frame structure.

2. The method of claim 1, wherein the non-data section comprises mapping information for at least one of the first section and the second section.

3. The method of claim 1, wherein the non-data section comprises at least one of a preamble, a frame control header (FCH), a burst, and a map of at least one of the first section and the second section.

4. The method of claim 3, wherein the second section follows the first section in at least one of time sequence and frequency spectrum.

5. The method of claim 1, wherein a portion of the first section may be in guard band or non-communicational region of the first system.

6. The method of claim 1, wherein each of the first section and the second section carries at least one of uplink and downlink data.

7. The method of claim 1, wherein the second section carries mapping information for data in the second section.

8. A method of constructing a frame structure for data transmission, the method comprising:
generating a first section comprising data configured in a first format compatible with a first communication system using symbols;
generating a second section following the first section, the second section comprising data configured in a second format compatible with a second communication system using symbols, wherein the first communication system's symbols and the second communication system's symbols co-exist in one transmission scheme and wherein the second communication system has pilot symbols that are denser than those in the first communication system;
generating at least one non-data section containing information describing an aspect of data in at least one of the first section and the second section; and
combining the first section, the second section and the at least one non-data section to form the frame structure.

9. A method of generating a frame for a communication system having a first communication system and a second communication system, the method comprising:
generating a first sub-frame for downlink transmission, wherein the first sub-frame comprises:
a first region comprising first mapping information;
a second region comprising second mapping information; and
a third region carrying data to be transferred in the downlink transmission, the third region comprising a first sub-region and a second sub-region, wherein the first sub-region and second sub-region are defined by the first mapping information, the first sub-region being configured to carry first data of the first communication system using symbols and the second sub-region being configured to carry second data of the second communication system using symbols in the downlink transmission, wherein the third region further comprises a fifth sub-region, the fifth sub-region being configured to carry fifth data of the first communication system or the second communication system under high mobility in the downlink transmission and each symbol in the fifth sub-region has a shorter symbol period than that in at least one of the first or second communication system, and
generating a second sub-frame for uplink transmission, wherein the second sub-frame comprises:
a fourth region configured to carry data to be transferred in the uplink transmission, the fourth region comprising a third sub-region and a fourth sub-region, wherein the third sub-region and the fourth sub-region are defined by the second mapping information, the third sub-region being configured to carry third data of the first communication system and the fourth sub-region being configured to carry fourth data of the second communication system in the uplink transmission, wherein the first communication system's symbols and the second communication system's symbols co-exist in one transmission scheme.

10. The method of claim 9, wherein the second sub-region further comprises third mapping information for data placement in the second sub-region.

11. The method of claim 9, wherein the fifth sub-region is defined by the first mapping information.

12. The method of claim 9, wherein the fifth sub-region further comprises fourth mapping information for defining data placement in the fifth sub-region.

13. The method of claim 9, wherein the fourth region further comprises a sixth sub-region, the sixth sub-region being configured to carry sixth data of the first communication system or the second communication system under high mobility in the uplink transmission.

14. The method of claim 13, wherein pilot symbols in the sixth sub-region are denser than those in at least one of the first or second communication system.

15. The method of claim 13, wherein each symbol in the sixth sub-region has a shorter symbol period than that in at least one of the first or second communication system.

16. The method of claim 13, wherein the sixth sub-region is defined by the second mapping information.

17. The method of claim 13, wherein the sixth sub-region further comprises fifth mapping information for defining data placement in the sixth sub-region.

18. A method of generating a frame for a communication system having a first communication system using symbols and a second communication system using symbols, the method comprising:
generating a first sub-frame for downlink transmission, wherein the first sub-frame comprises:
a first region comprising first mapping information;
a second region comprising second mapping information; and
a third region carrying data to be transferred in the downlink transmission, the third region comprising a first sub-region and a second sub-region, wherein the first sub-region and second sub-region are defined by the first mapping information, the first sub-region being configured to carry first data of the first communication system and the second sub-region being configured to carry second data of the second communication system in the downlink transmission, wherein the third region further comprises a fifth sub-region having pilot symbols that are denser than those in at least one of the first or second sub-region, and
generating a second sub-frame for uplink transmission, wherein the second sub-frame comprises:
a fourth region configured to carry data to be transferred in the uplink transmission, the fourth region comprising a third sub-region and a fourth sub-region, wherein the third sub-region and the fourth sub-region are defined by the second mapping information, the third sub-region being configured to carry third data of the first communication system and the fourth sub-region being configured to carry fourth data of the second communication system in the uplink transmission, wherein the first communication system's symbols and the second communication system's symbols co-exist in one transmission scheme.

19. A method of generating a frame for transferring data in a communication system, the communication system comprising a first system and a second system, the method comprising:
generating a first frame comprising a first sub-frame for downlink transmission and a second sub-frame for uplink transmission in a first frequency band;
generating a second frame comprising a third sub-frame for downlink transmission and a fourth sub-frame for uplink transmission in a second frequency band;

identifying a guard band between the first frequency band and the second frequency band; and generating a third frame comprising a fifth sub-frame for downlink transmission and a sixth sub-frame for uplink transmission in the guard band.

wherein the first frame is configured to carry data of the first system and data of the second system in parallel with the second frame being configured to carry data of the first system and data of the second system, and wherein the third frame is configured to carry data of the second system but not data of the first system.

20. The method of claim 19, wherein at least one of the first sub-frame or the third sub-frame comprises:

a first region comprising first mapping information;

a second region comprising second mapping information; and a third region carrying data to be transferred in the downlink transmission, the third region comprising a first sub-region and a second sub-region, wherein the first sub-region and second sub-region are defined by the first mapping information, the first sub-region being configured to carry first data of the first system and the second sub-region being configured to carry second data of the second system in the downlink transmission.

21. The method of claim 20, wherein the second sub-region further comprises third mapping information for data placement in the second sub-region.

22. The method of claim 20, wherein the third region further comprises a fifth sub-region, the fifth sub-region being configured to carry fifth data of the first system or the second system under high mobility in the downlink transmission.

23. The method of claim 22, wherein pilot symbols in the fifth sub-region are denser than those in at least one of the first or second system.

24. The method of claim 22, wherein each symbol in the fifth sub-region has a shorter symbol period than that in at least one of the first or second system.

25. The method of claim 22, wherein the fifth sub-region is defined by the first mapping information.

26. The method of claim 22, wherein the fifth sub-region further comprises fourth mapping information for defining data placement in the fifth sub-region.

27. The method of claim 22, wherein the fourth region further comprises a sixth sub-region, the sixth sub-region being configured to carry sixth data of the first communication system or the second communication system under high mobility in the uplink transmission.

28. The method of claim 27, wherein pilot symbols in the sixth sub-region are denser than those in at least one of the first or second communication system.

29. The method of claim 27, wherein each symbol in the sixth sub-region has a shorter symbol period than that in at least one of the first or second communication system.

30. The method of claim 27, wherein the sixth sub-region is defined by the second mapping information.

31. The method of claim 30, wherein the band further comprises sixth mapping information defining first placement of the data carried by the band.

32. The method of claim 30, wherein the third mapping information defines second placement of the data carried by the band.

33. The method of claim 27, wherein the sixth sub-region further comprises fifth mapping information for defining data placement in the sixth sub-region.

34. The method of claim 19, wherein at least one of the second sub-frame or the fourth sub-frame comprises:

a fourth region carrying data to be transferred in the uplink transmission, the fourth region comprising a third sub-region and a fourth sub-region, wherein the third sub-region and the fourth sub-region are defined by second mapping information, the third sub-region being configured to carry third data of the first system and the fourth sub-region being configured to carry fourth data of the second system in the uplink transmission.

35. The method of claim 19, further comprising a band between the first frame and the third frame, wherein the band is applicable for carrying data of the first communication system or the second communication system.

36. The method of claim 19, wherein at least one of the first frame or second frame comprises, and the third frame is devoid of, a region comprising a ranging sub-channel.

37. A method of allocating information in a frame of a communication system, the communication system comprising:

a first communication system using symbols and a second communication system using symbols, the frame configured for performing first data transmission of the first communication system, second data transmission of the second communication system, and third data transmission of the first communication system or the second communication system under high mobility, the method comprising:

allocating data of the first communication system and the second communication system according to first mapping information;

dividing a data region of the frame to form a first sub-region and a second sub-region according to the first mapping information;

further dividing the data region of the frame into the first sub-region, the second sub-region and a third sub-region according to the first mapping information;

performing the first data transmission of the first communication system by using the first sub-region;

performing the second data transmission of the second communication system by using the second sub-region; and performing the third data transmission of the first communication system or the second communication system by using the third sub-region, wherein each symbol in the third sub-region has a shorter symbol period than that in at least one of the first or second sub-region, wherein the first communication system's symbols and the second communication system's symbols co-exist in one transmission scheme.

38. The method of claim 37, further comprising:

allocating data of the second communication system carried in the second sub-region in a second mapping information.

39. The method of claim 37, further comprising:

allocating data of the first communication system or the second communication system carried in the third sub-region in third mapping information.

40. A method of allocating information in a frame of a communication system, the communication system comprising:

a first communication system using symbols and a second communication system using symbols, the frame configured for performing first data transmission of the first communication system, second data transmission of the second communication system, the method comprising:

allocating data of the first communication system and the second communication system according to first mapping information;

dividing a data region of the frame to form a first sub-region and a second sub-region according to the first mapping information;

further dividing the data region of the frame into the first sub-region, the second sub-region and a third sub-region according to the first mapping information;

performing the first data transmission of the first communication system by using the first sub-region;

performing the second data transmission of the second communication system by using the second sub-region; and performing the third data transmission of the first communication system or the second communication system by using the third sub-region, wherein pilot symbols in the third sub-region are denser than those in at least one of the first or second sub-region, wherein the first communication system's symbols and the second communication system's symbols co-exist in one transmission scheme.

41. A method of allocating information in a frame of a communication system, the frame comprising:

a first frame, a second frame and a band between the first frame and the second frame, the communication system comprising a first communication system using symbols and a second communication system using symbols, the frame configured for performing first data transmission of the first communication system, second data transmission of the second communication system, and third data transmission of the first communication system or the second communication system under high mobility, the method comprising:

allocating data of the first communication system and the second communication system according to first mapping information or second mapping information;

dividing a data region of the first frame or the second frame to form a first sub-region, a second sub-region, a third sub-region or a second sub-region in the data region of the first frame or the second frame according to the first mapping information or the second mapping information;

further dividing the data region of the first frame or the second frame to form a fifth sub-region or a sixth sub-region according to the first mapping information;

performing the first data transmission of the first communication system by using the first sub-region or the third sub-region;

performing the second data transmission of the second communication system by using the second sub-region or the fourth sub-region; and performing the third data transmission of the first communication system or the second communication system by using the fifth sub-region or the sixth sub-region, wherein each symbol in one of the fifth and sixth sub-regions has a shorter symbol period than that in the data region of the first or the second frame other than the fifth and sixth sub-regions, wherein the first communication system's symbols and the second communication system's symbols co-exist in one transmission scheme.

42. The method of claim 41, further comprising:

carrying data of the first communication system or the second communication system by the band.

43. A method of allocating information in a frame of a communication system, the frame comprising:

a first frame, a second frame and a band between the first frame and the second frame, the communication system comprising a first communication system using symbols and a second communication system using symbols, the frame configured for performing first data transmission of the first communication system and second data transmission of the second communication system, the method comprising:

allocating data of the first communication system and the second communication system according to first mapping information or second mapping information;

dividing a data region of the first frame or the second frame to form a first sub-region, a second sub-region, a third sub-region or a second sub-region in the data region of the first frame or the second frame according to the first mapping information or the second mapping information;

further dividing the data region of the first frame or the second frame to form a fifth sub-region or a sixth sub-region according to the first mapping information, wherein pilot symbols in one of the fifth and sixth sub-regions are denser than those in the data region of the first or the second frame other than the fifth and sixth sub-regions;

performing the first data transmission of the first communication system by using the first sub-region or the third sub-region; and performing the second data transmission of the second communication system by using the second sub-region or the fourth sub-region; and performing the third data transmission of the first communication system or the second communication system by using the fifth sub-region or the sixth sub-region, wherein each symbol in one of the fifth and sixth sub-regions has a shorter symbol period than that in the data region of the first or the second frame other than the fifth and sixth sub-regions, wherein the first communication system's symbols and the second communication system's symbols co-exist in one transmission scheme.

* * * * *